United States Patent [19]

Phillips et al.

[11] 4,124,108
[45] Nov. 7, 1978

[54] GRAIN DISPENSING ARRANGEMENT

[76] Inventors: Paul E. Phillips; John E. Vinson, both of R.R. 1, Hazleton, Ind. 47640

[21] Appl. No.: 701,534

[22] Filed: Jul. 1, 1976

Related U.S. Application Data

[63] Continuation of Ser. No. 517,926, Oct. 25, 1974, abandoned.

[51] Int. Cl.² .............................................. B65G 11/12
[52] U.S. Cl. ........................................ 193/16; 193/17; 193/32; 214/17 C
[58] Field of Search .................................. 302/33–34, 302/60–61, 63, 59; 193/16–17, 32, 3–4; 214/17 C; 222/461, 526, 533–536; 285/164, 168, 184, 273, 261

[56] References Cited

U.S. PATENT DOCUMENTS

| | | | |
|---|---|---|---|
| 809,470 | 1/1906 | Schuman | 302/34 |
| 1,771,787 | 7/1930 | Heller | 302/34 |
| 1,918,133 | 7/1933 | Rennels | 193/17 |
| 2,757,030 | 7/1956 | Koppel | 285/273 X |
| 2,828,164 | 3/1958 | Spence | 302/63 |
| 2,951,716 | 9/1960 | Myers | 285/273 |
| 3,334,926 | 8/1967 | Faccou | 285/261 X |

FOREIGN PATENT DOCUMENTS 631,867 11/1949 United Kingdom ............... 193/16

Primary Examiner—Stanley H. Tollberg
Assistant Examiner—Charles A. Marmor
Attorney, Agent, or Firm—Warren D. Flackbert

[57] ABSTRACT

An arrangement for dispensing grain, or other like material, characterized by (1) a cushion box communicating with a material passageway, at a material receiving bin, in a ball and socket relationship, including a material outlet and a slot for eliminating trapped material; and, (2) a ball joint, at the upper end of the material passageway, providing versatility in application.

5 Claims, 4 Drawing Figures

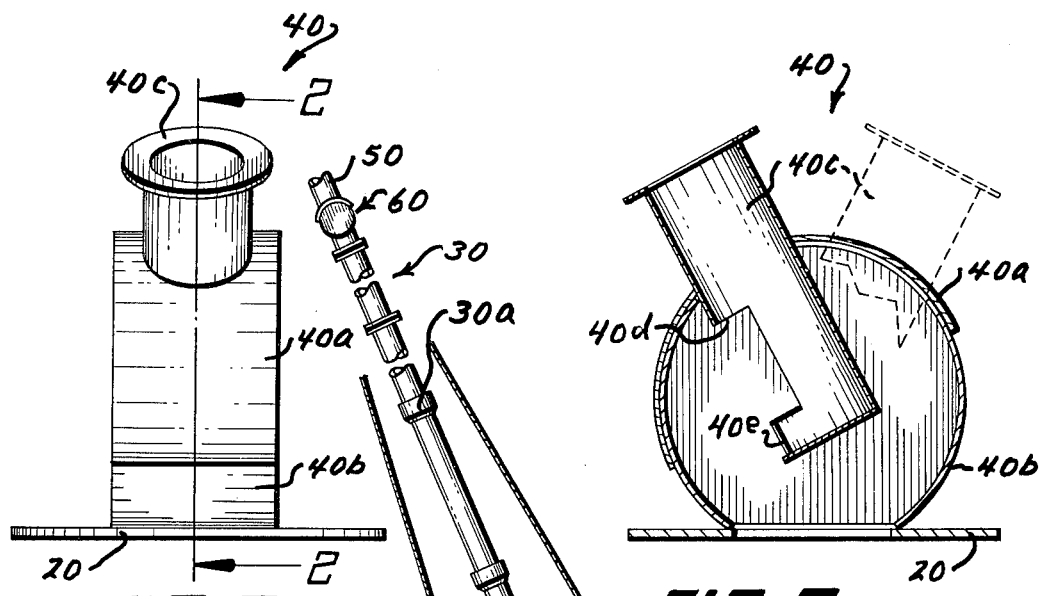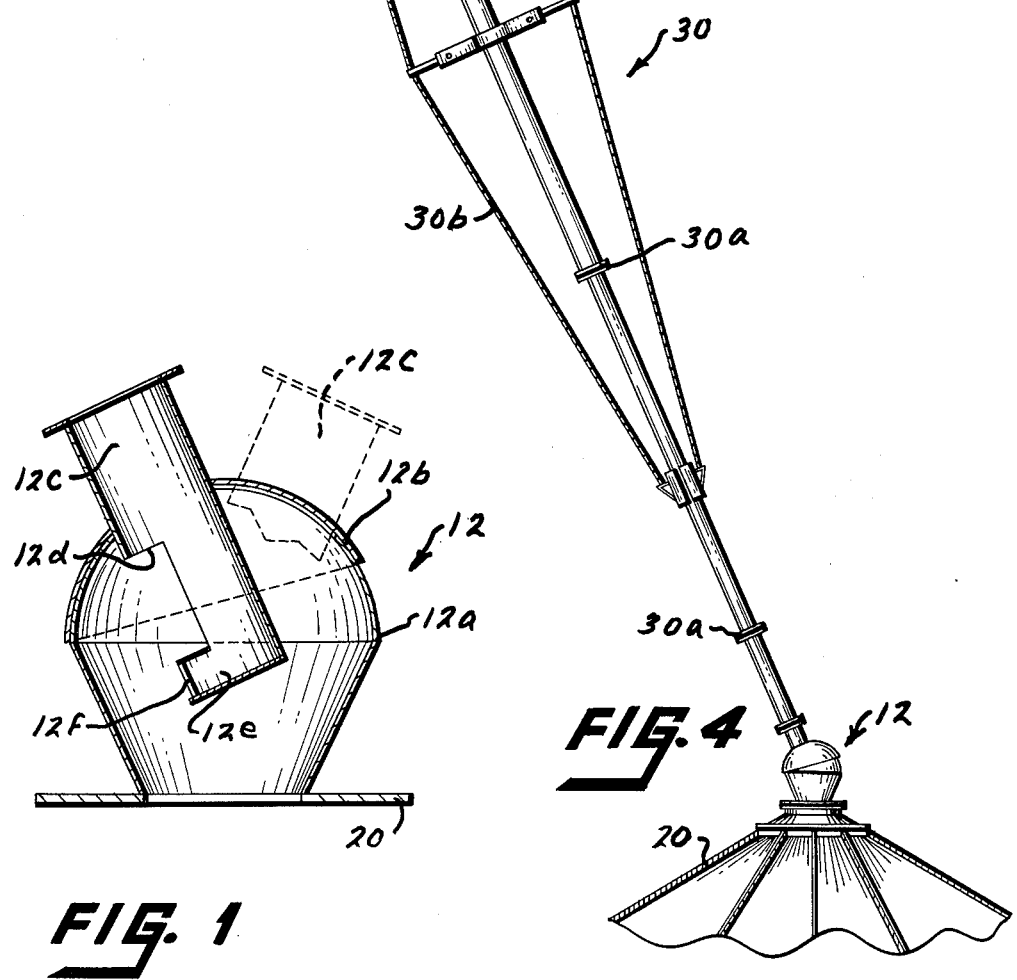

GRAIN DISPENSING ARRANGEMENT

The present application is a continuation of the now-abandoned U.S. patent application Ser. No. 517,926, filed Oct. 25, 1974.

As is known, the storage of agricultural products, such as grain, beans or corn is an important factor in a satisfactory farming operation. In this connection, the grain, or the like, hereinafter referred to, for ease of discussion, as material, is raised, typically, by a conventional belt bucket elevator, from a source, as a wagon, and thereafter, deposited in receiving or storage bins.

In this connection the aforesaid belt bucket elevator raises the material to a level for passage to, generally, several storage bins, introducing the material into a distributor, and, thereafter, such material moves, by gravity, through spouts or conduits to the aforementioned storage bins. A basic problem encountered in arrangements presently in use is the lack of versatility in two particular regions, i.e. the form of joint interconnecting the material passageway or conduit with the distributor proximate the bucket belt conveyor, and, additionally, the design of the cushion dome at the end of the material conduit or passageway at the connection thereof to a storage bin.

While, as stated, more than one storage bin is normally employed, the description herein is limited to a single unit, for ease in understanding. In any event, the invention includes a joint interconnecting the distributor, being in the form of a ball-type universally movable arrangement, and a cushion dome, at the storage bin, which retards or cushions the gravitational flow of the material, thereby preventing any "bottling" effect, where such is also dependent upon ball and joint action for either universal or pivotal/rotational movement.

Actually, the invention is representative of not only a simplicity of components, but ready adaptation to existing installations. In other words, a versatility in grain, or similar material, movement is provided which overcomes problems inherent with systems presently on the market.

A better understanding of the present invention will become more apparent from the following description, taken in conjunction with the accompanying drawing, wherein FIG. 1 is a view of a cushion dome in accordance with the teachings of the present invention, being partly in vertical section and partly in phantom, showing a preferred hemispherical embodiment;

FIG. 2 is a view in side elevation, taken at line 2—2 of FIG. 3 and looking in the direction of the arrows, also partly in vertical section and partly in phantom, showing another embodiment of the invention, in this instance a cushion dome movable in a single plane;

FIG. 3 is a view in end elevation, corresponding to the invention embodiment of FIG. 2; and, FIG. 4 is an overall representative view of a typical completed installation, showing the cushion dome and the ball joint defining the invention.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the figures, and particularly to FIG. 1, a preferred form of cushion dome 12 is disclosed, defined by a lower portion 12a, being hemispherical in part, mounted onto a material receiving or storage bin 20 (see FIG. 4) of a typical grain storage system. An upper portion 12b thereof is universally rotatable on the hemispherical part of lower portion 12a of this form of cushion dome 12, where a material (such as grain) receiving passageway or conduit 12c completes the unit, communicating with a material flow conduit 30 (again see FIG. 4).

The conduit 12c is, as apparent, movable in multiple directions, for ready response to a position of the material flow conduit 30. The conduit 12c has a cutout portion 12d, providing for exit of the gravity flowing material. A space 12e is disposed beneath the cut-out portion 12d, serving as a receiving cavity for the moving material, in an important cushioning effect.

Aside from such cushioning effect, a slot 12f is disposed in communicating relationship with the cushioning space 12e beneath the cut-out portion 12d, preventing any "bottling" of material from such cushioning space 12e. Such provides a valuable feature in conventional usage. Moreover, as is apparent from FIG. 1, the phantom lines indicate one of the variety of positions which the upper portion 12b, and associated conduit 12c, may assume on the lower portion 12a of the cushion dome 12, providing highly effective usage in connection with the fixed position of the storage bin 20.

FIGS. 2 and 3 show an alternative embodiment of cushion dome 40, in this instance defined by an upper portion 40a movable, in a single plane, on a lower portion 40b. As in the embodiment of FIG. 1, the upper portion 40a has a receiving conduit 40c, with associated cut-out portion 40d, and slot 40e. The same result is achieved, as described hereabove, upon movement of the upper portion 40a, to, for example, the indicated phantom line position shown. Thus, versatility in grain movement, or like material, is provided with respect to the storage or receiving bin 20 (FIG. 4).

FIG. 4 shows the FIG. 1 universal type of cushion dome 12, in association with the storage bin 20, but, additionally, the material or grain passageway or conduit 30 connecting thereto. Conduit 30 may be in interconnected sections, joined by collars or fittings 30a, with reinforcing framework 30b.

While, in FIG. 4, the belt bucket grain elevator is not shown, nor the distributor fully shown (both being conventional), the invention further encompasses a ball joint 60 providing a versatility with such distributor. In other words, the ball joint 60 communicates through conduit 50 of the distributor, and interconnects therewith for material flow through conduit 30, serving for adaptability to various positions of the storage bin(s) 20 and the distributor feed from the belt bucket conveyor.

Thus, from the preceding, the two-fold advantages of the invention should be evident, i.e. the particular configuration of the cushion dome, being universal or planar in movement, and the universal ball joint, each being on opposite ends of the grain or material passageway, i.e. between the distributor and the receiving area or bin.

Obviously, therefore, the invention is adaptable to a variety of installations, i.e. in the number of storage or receiving bins and/or the number of material passageways interconnecting a distributor. While full details of the storage bin or the distributor are not shown, being known in the art, the importance of the invention lies in the cushion box embodiments and the ball joint interconnection with the distributor.

Thus, it is apparent that the above description could be modified within the spirit of the invention, including, for example, changes in proportioning, variety of slot configurations, and, as well, configurations of the cutout material exit in the cushion dome, or the like. The preceding, therefore, should be considered illustrative, and not as limiting the scope of the following claims:

We claim:

1. A grain transporting and dispensing arrangement comprising a distributor, a receiving container and a flow conduit interconnecting said distributor and said receiving container, said receiving container mounting a rotatable dome defined by a first portion movable on a second portion, a receiving conduit projecting from said first portion having an upper end opening to the outside of said dome communicating with said flow conduit and a closed lower end within said dome, and said second portion communicating with said receiving container, said receiving conduit having an opening in a side thereof within said dome and spaced apart from said closed lower end to define a grain cushioning space between said opening and said closed lower end.

2. The grain transporting and dispensing arrangement of claim 1 where said flow conduit includes a rotatable joint at an upper end thereof communicating with said distributor.

3. The grain transporting and dispensing arrangement of claim 1 where said first portion of said rotatable dome is universally mounted on said second portion.

4. The grain transporting and dispensing arrangement of claim 1 having means limiting movement of said first portion of said rotatable dome on said second portion to a single vertical plane.

5. The grain transporting and dispensing arrangement of claim 1 where said receiving conduit includes slot means communicating with said grain cushioning space between said opening and said closed end to prevent bottling of said grain in said grain cushioning space.

* * * * *